(12) United States Patent
Onishi et al.

(10) Patent No.: US 11,410,434 B2
(45) Date of Patent: Aug. 9, 2022

(54) VEHICLE CONTROL DEVICE AND VEHICLE CONTROL METHOD

(71) Applicant: Mitsubishi Electric Corporation, Tokyo (JP)

(72) Inventors: Kenta Onishi, Tokyo (JP); Nariaki Takehara, Tokyo (JP); Masahiro Yata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/056,105

(22) PCT Filed: Jul. 10, 2018

(86) PCT No.: PCT/JP2018/026007
§ 371 (c)(1),
(2) Date: Nov. 17, 2020

(87) PCT Pub. No.: WO2020/012552
PCT Pub. Date: Jan. 16, 2020

(65) Prior Publication Data
US 2021/0209383 A1 Jul. 8, 2021

(51) Int. Cl.
*G06K 9/00* (2022.01)
*G06V 20/58* (2022.01)
(Continued)

(52) U.S. Cl.
CPC ......... *G06V 20/586* (2022.01); *G06K 9/6267* (2013.01); *G06T 7/0002* (2013.01);
(Continued)

(58) Field of Classification Search
CPC .............. G06K 9/00812; G06K 9/6267; G06T 7/0002; G06T 7/20; G06T 2207/30241;
(Continued)

(56) References Cited

U.S. PATENT DOCUMENTS

2014/0114529 A1* 4/2014 An ................... B60W 30/06
   701/36
2018/0339700 A1* 11/2018 Lee .................. G06K 9/00362

FOREIGN PATENT DOCUMENTS

| JP | 2009-25980 A | 2/2009 |
| JP | 2014-84096 A | 5/2014 |
| JP | 2016-215691 A | 12/2016 |

OTHER PUBLICATIONS

International Search Report for PCT/JP2018/026007, dated Sep. 25, 2018.

* cited by examiner

*Primary Examiner* — Dhaval V Patel
(74) *Attorney, Agent, or Firm* — Sughrue Mion, PLLC; Richard C. Turner

(57) ABSTRACT

A vehicle control device includes a parking space candidate detection unit configured to detect a parking space candidate that is a candidate for a parking space where an own vehicle is parked, using a vehicle peripheral image acquired from a camera; a leaving path detection unit configured to detect, using the vehicle peripheral image, a leaving path on which another vehicle that is parked in an other vehicle parking space located in a periphery of the parking space candidate leaves the other vehicle parking space; and a nuisance parking determination unit configured to perform nuisance parking determination including determining, for each detected parking space candidate, whether the parking space candidate overlaps with the detected leaving path, and thereby classifying the parking space candidate into a nuisance parking space that overlaps with the leaving path or a non-nuisance parking space that avoids overlapping with the leaving path.

6 Claims, 3 Drawing Sheets

(51) Int. Cl.
  *G06K 9/62* (2022.01)
  *G06T 7/00* (2017.01)
  *G06T 7/20* (2017.01)
  *B60Q 9/00* (2006.01)
(52) U.S. Cl.
  CPC ............... *G06T 7/20* (2013.01); *B60Q 9/008* (2013.01); *G06T 2207/30241* (2013.01); *G06T 2207/30264* (2013.01)
(58) Field of Classification Search
  CPC ......... G06T 2207/30264; B60Q 9/008; B60W 30/06
  See application file for complete search history.

VEHICLE CONTROL DEVICE AND VEHICLE CONTROL METHOD

CROSS REFERENCE TO RELATED APPLICATIONS

This application is a National Stage of International Application No. PCT/JP2018/026007 filed Jul. 10, 2018.

TECHNICAL FIELD

The present invention relates to a vehicle control device and a vehicle control method configured to perform a nuisance parking determination for each parking space candidate that is a parking space candidate where an own vehicle can be parked.

BACKGROUND ART

Conventionally, as a parking assisting apparatus for assisting parking a vehicle, parking assisting apparatuses provided with following configurations have been proposed (See, for example, patent literature 1).

The parking assisting apparatus described in patent literature 1 includes an obstacle detection unit, an empty space determination unit, and a parking space determination unit. The obstacle detection unit detects plural kinds of obstacles in a periphery of a vehicle to parking of the vehicle. The empty space determination unit detects an empty space in the periphery of the vehicle based on the results of detection by the obstacle detection unit. The parking space determination unit determines whether the empty space detected by the empty space determination unit includes a space for parking the vehicle.

CITATION LIST

Patent Literature

[PTL 1] JP 2016-215691 A

SUMMARY OF INVENTION

Technical Problem

The above-described parking assisting apparatus is configured to detect an obstacle of a kind other than vehicles, and determine a space, in which the obstacle is not present within the empty space, to be a parking space for an own vehicle. However, the above-described parking assisting apparatus does not take into account a parking position of another vehicle that has already been parked in a periphery of the parking space for the own vehicle when the parking space for the own vehicle is determined.

Thus, when the own vehicle is parked in the parking space determined by the above-described parking assisting apparatus, the other vehicle that has already been parked in a parking space for the other vehicle located in the periphery of the parking space for the own vehicle may not be able to leave the parking space for the other vehicle, obstructed by the own vehicle.

That is, the parking of the own vehicle can be a nuisance to the other vehicle depending on a parking position of the own vehicle. In the following, the parking that can be a nuisance to the other vehicle will be referred to as a "nuisance parking". A technique that makes is possible to determine whether a parking space of an own vehicle is a parking space that will cause a nuisance parking is required.

The present invention has been made to solve the problem described above, and has an object to obtain a vehicle control device and a vehicle control method that can distinguish whether an own vehicle parking space is a parking space that will cause a nuisance parking.

Solution to Problem

According to an aspect of the present invention, there is provided a vehicle control device including a parking space candidate detection unit configured to detect a parking space candidate that is a candidate for a parking space where an own vehicle is parked, using a vehicle peripheral image acquired from a camera; a leaving path detection unit configured to detect, using the vehicle peripheral image, a leaving path on which another vehicle that is parked in an other vehicle parking space located in a periphery of the parking space candidate leaves the other vehicle parking space; and a nuisance parking determination unit configured to perform nuisance parking determination including determining, for each parking space candidate detected by the parking space candidate detection unit, whether the parking space candidate overlaps with the leaving path detected by the leaving path detection unit, and thereby classifying the parking space candidate into a nuisance parking space that overlaps with the leaving path or a non-nuisance parking space that avoids overlapping with the leaving path.

According to another aspect of the present invention, there is provided a control method of a vehicle including a step of detecting a parking space candidate that is a candidate for a parking space where an own vehicle is parked, using a vehicle peripheral image; a step of detecting, using the vehicle peripheral image, a leaving path on which another vehicle that is parked in an other vehicle parking space located in a periphery of the parking space candidate leaves the other vehicle parking space; and a step of performing nuisance parking determination including determining, for each detected parking space candidate, whether the parking space candidate overlaps with the detected leaving path, and thereby classifying the parking space candidate into a nuisance parking space that overlaps with the leaving path or a non-nuisance parking space that avoids overlapping with the leaving path.

Advantageous Effects of Invention

According to the present invention, a vehicle control device and a control method of a vehicle that can distinguish whether an own vehicle parking space is a parking space that will cause a nuisance parking are obtained.

DESCRIPTION OF EMBODIMENTS

Figure 1:
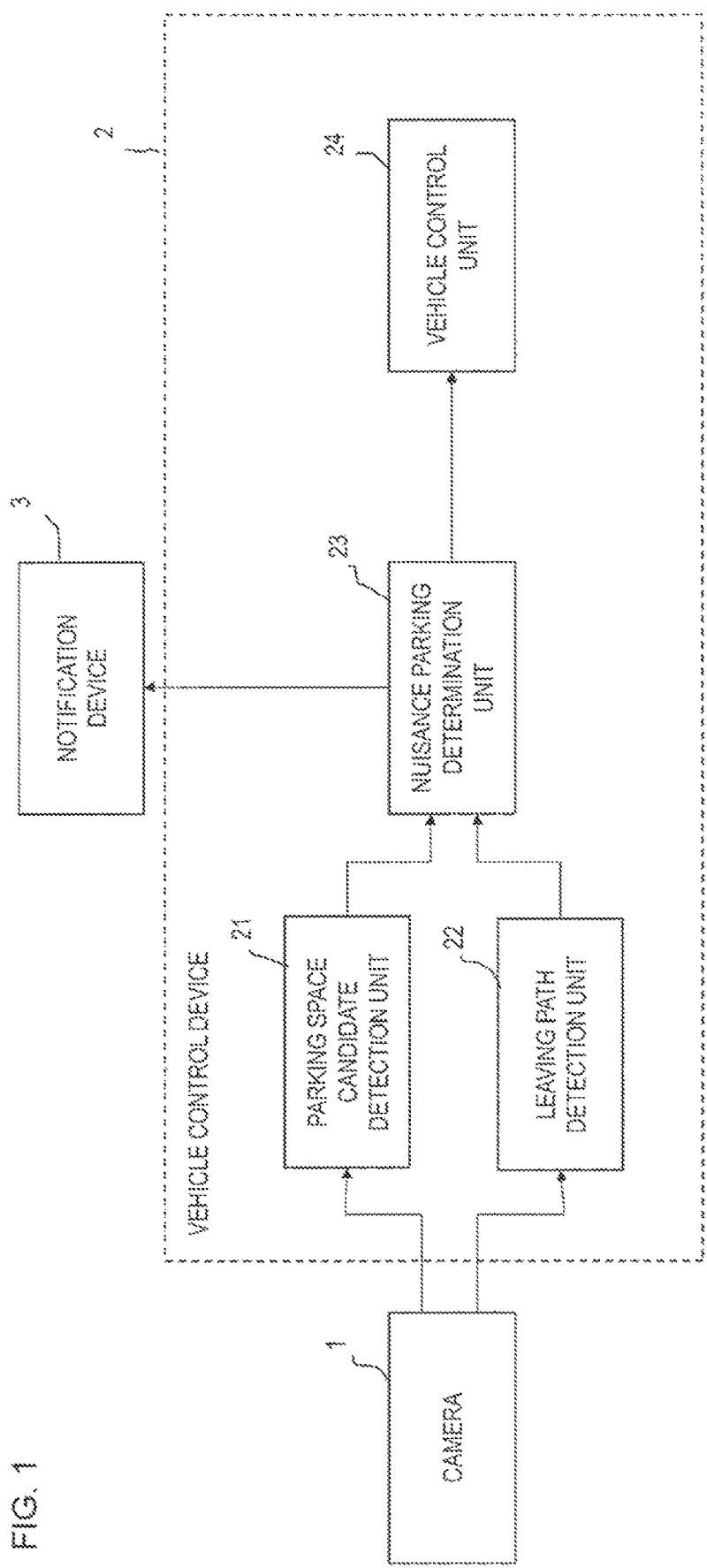
FIG. 1 is a block diagram depicting a configuration of a vehicle system provided with a vehicle control device according to a first embodiment.

In the following, a vehicle control device and a control method of a vehicle according to a preferred embodiment will be described with reference to drawings. In the description of the drawings, the same or corresponding components are denoted with the same reference numerals, respectively, and redundant description will be omitted.

First Embodiment

FIG. 1 is a block diagram depicting a configuration of a vehicle system provided with a vehicle control device 2 according to a first embodiment. The vehicle system, illustrated in FIG. 1, includes a camera 1, the vehicle control device 2, and a notification device 3.

The camera 1 is mounted on a vehicle so that the camera can image a periphery of the vehicle. The camera 1 images the periphery of the vehicle, and outputs a result of imaging to the vehicle control device 2 as a vehicle peripheral image.

The vehicle control device 2 is provided with a parking space candidate detection unit 21, a leaving path detection unit 22, a nuisance parking determination unit 23, and a vehicle control unit 24.

The parking space candidate detection unit 21 detects a parking space candidate that is a parking space candidate where the own vehicle can be parked, using the vehicle peripheral image acquired from the camera 1.

The leaving path detection unit 22 detects, using the vehicle peripheral image acquired from the camera 1, a leaving path on which another vehicle that is parked in an other vehicle parking space located in a periphery of the parking space candidate, detected by the parking space candidate detection unit 21, leaves the other vehicle parking space.

The nuisance parking determination unit 23 performs a nuisance parking determination for each parking space candidate detected by the parking space candidate detection unit 21. That is, the nuisance parking determination unit 23 classifies the parking space candidate into a parking space that will cause a nuisance parking to occur or a parking space that will not cause a nuisance parking to occur. In the following, the parking space that will cause a nuisance parking will be referred to as a "nuisance parking space", and the parking space that will not cause a nuisance parking will be referred to as a "non-nuisance parking space".

The nuisance parking determination unit 23 specifies the parking space candidate, which is classified into the non-nuisance parking space as a result of the nuisance parking determination, to be an own vehicle parking space for parking the own vehicle. The nuisance parking determination unit 23 notifies of the result of the nuisance parking determination by using the notification device 3, which will be described later.

The vehicle control unit 24 controls the own vehicle to park the own vehicle in the own vehicle parking space specified by the nuisance parking determination unit 23.

The notification device 3 notifies of the result of the nuisance parking determination visually or aurally under the control of the nuisance parking determination unit 23. The notification device 3 notifies of the result by, for example, issuing a sound message, warning with an alarm sound, displaying a message on a display device such as a car navigation system, or the like.

Moreover, in addition to the camera 1, a sensor such as a sonar or a millimeter wave radar may be used. According to detection of another vehicle by the above-described sensor, it becomes possible to detect information on an empty space in a periphery of the own vehicle, a sire of the other vehicle, a position where the other vehicle is parked, a direction of leaving an other vehicle parking space, or the like.

Figure 2:
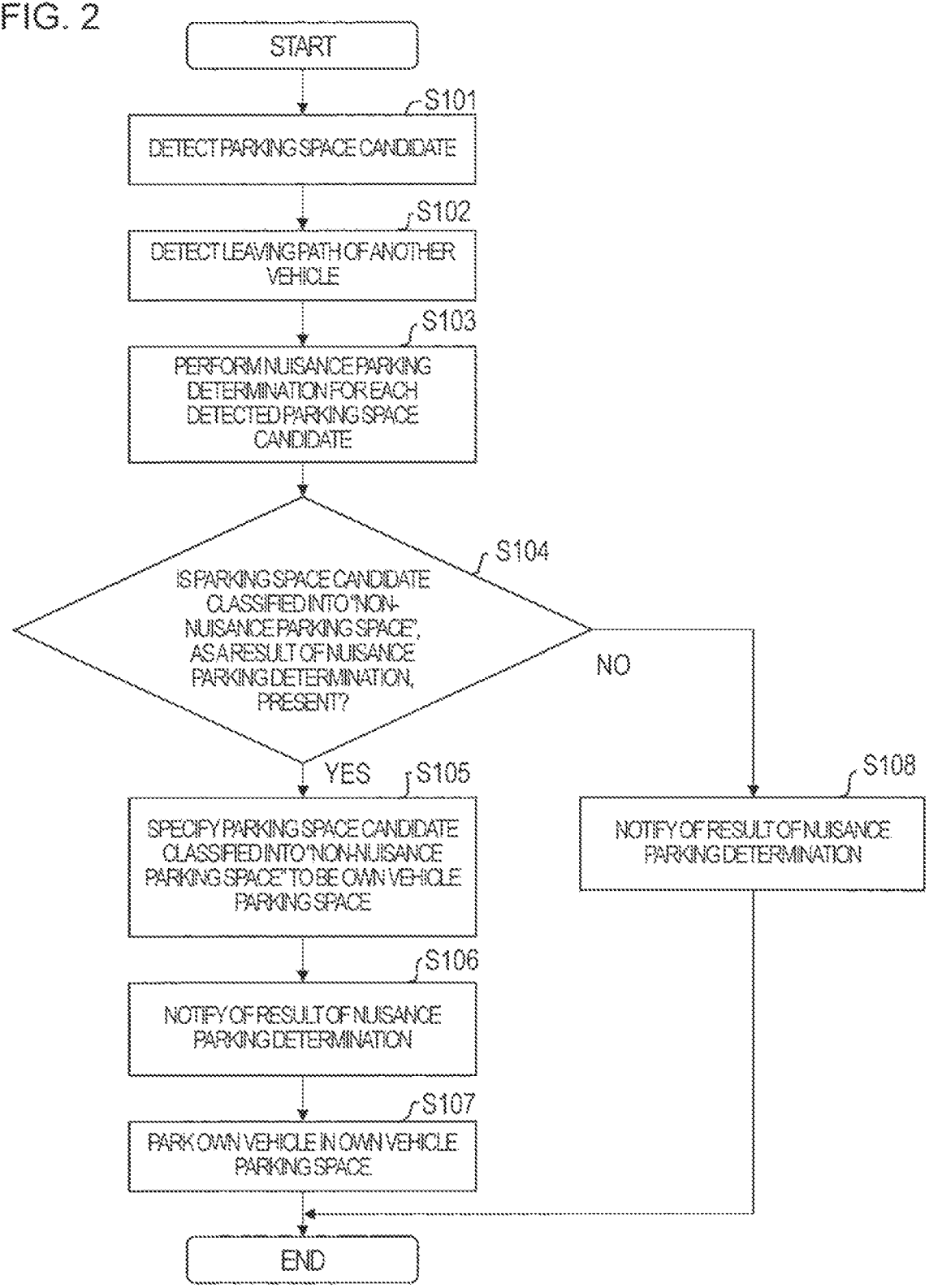
FIG. 2 is a flowchart depicting an operation of the vehicle control device according to the first embodiment.

Next an operation of the vehicle control device 2 will be described with reference to FIG. 2. FIG. 2 is a flowchart depicting an operation of the vehicle control device 2 according to the first embodiment.

The parking space candidate detection unit 21 detects a parking space candidate based on a vehicle peripheral image acquired from the camera 1 (Step S101). Then, the process proceeds to Step S102.

In the following, an example of the process of detecting a parking space candidate by the parking space candidate detection unit 21 will be described. The parking space candidate detection unit 21 stores a vehicle size of the own vehicle in advance. The vehicle size includes a vehicle width which is a width of a vehicle and a vehicle length which is a length of the vehicle.

The parking space candidate detection unit 21 detects an empty space having a size greater than the vehicle size of the own vehicle, i.e. a size of a rectangle defined by the vehicle width and the vehicle length of the own vehicle, by using the vehicle peripheral image acquired from the camera 1. The parking space candidate detection unit 21 determines, based on the vehicle size of the own vehicle, a parking space candidate where the own vehicle can be parked within the detected empty space. In this way, the parking space candidate detection unit 21 can detect a parking space candidate.

More specifically, when frame lines of a parking space are present, the parking space candidate detection unit 21 detects the frame lines. When the own vehicle can be parked in the space surrounded by the frame lines, the parking space candidate detection unit 21 determines the space to be a parking space candidate. When such frame lines are not present, the parking space candidate detection unit 21 detects a space between vehicles that are parked. When the own vehicle can be parked in the space, the parking space candidate detection unit 21 determines the space to be a parking space candidate.

The leaving path detection unit 22 detects a leaving path for the other vehicle based on the vehicle peripheral image acquired from the camera 1 (Step S102). Then, the process proceeds to Step S103.

In the following, an example of the process of detecting a leaving path of another vehicle by the leaving path detection unit 22 will be described. The leaving path detection unit 22 detects the other vehicle that has already been parked in a periphery of the parking space candidate, detected by the parking space candidate detection unit 21, e.g. within 5 m from the parking space candidate, using the vehicle peripheral image.

The leaving path detection unit 22 also detects vehicle information of the detected other vehicle using the vehicle peripheral image. The vehicle information of the other vehicle includes a position at which the other vehicle is parked, a vehicle size of the other vehicle, and a leaving direction of the other vehicle. The leaving direction of the other vehicle is a direction of motion of the other vehicle when the other vehicle leaves the other vehicle parking space.

More specifically, as an example, the leaving path detection unit 22 extracts a vehicle size of the detected other vehicle from a database in which the vehicle size has been stored in advance. As another example, the leaving path detection unit 22 estimates the vehicle size of the other vehicle from an image of the detected other vehicle. Moreover, the leaving path detection unit 22 specifies the position, at which the other vehicle is parked, from the image of the detected other vehicle. Furthermore, the leaving path detection unit 22 specifies the leaving direction of the other vehicle by distinguishing whether the other vehicle is parked forward or parked backward from the image of the detected other vehicle.

The leaving path detection unit 22 detects, as a leaving path of the other vehicle, a region between virtually extended lines which are obtained by extending longer sides of a rectangle, defined by the vehicle size of the other vehicle, in the leaving direction of the other vehicle. According to the above-described process, the leaving path detection unit 22 can detect the leaving path of the other vehicle.

The nuisance parking determination unit 23 performs a nuisance parking determination for each of the parking space candidates detected in Step S101, using the leaving path of the other vehicle detected in Step S102 (Step S103). Then, the process proceeds to Step S104.

In the following, the process of determining nuisance parking performed by the nuisance parking determination unit 23 will be described. The nuisance parking determination unit 23 determines, for each of the parking space candidates detected by the parking space candidate detection unit 21, whether the parking space candidate overlaps with the leaving path detected by the leaving path detection unit 22.

When the own vehicle is parked in a parking space candidate that overlaps with the leaving path of the other vehicle, the other vehicle is considered to be unable to leave the other vehicle parking space obstructed by the own vehicle. On the other hand, when the own vehicle is parked in a parking space candidate that does not overlap with the leaving path of the other vehicle, the other vehicle is considered to be able to leave the other vehicle parking space, without being affected from the own vehicle.

Then, the nuisance parking determination unit 23, with reference to results of the above-described determination process, classifies the parking space candidate that overlaps with the leaving path into a nuisance parking space, and classifies the parking space candidate that does not overlap with the leaving path into a non-nuisance parking space.

In this way, the nuisance parking determination unit 23 performs nuisance parking determination, which includes determining, for each of the parking space candidates, whether the parking space candidate overlaps with the leaving path, and thereby classifying the parking space candidate into the nuisance parking space that, overlaps with the leaving path or the non-nuisance parking space that avoids overlapping with the leaving path.

The nuisance parking determination unit 23 determines whether a parking space candidate that has been classified into the "non-nuisance parking space" is present, based on results of the above-described nuisance parking determination performed in Step S103 (Step S104).

When the parking space candidate classified into the "non-nuisance parking space" is determined to be present in Step S104, the process proceeds to Step S105. On the other hand, when the parking space candidate classified into the "non-nuisance parking space" is not determined to be present in Step S104, the process proceeds to Step S108.

The nuisance parking determination unit 23 specifies the parking space candidate classified into the "non-nuisance parking space" to be an own vehicle parking space (Step S105). Then, the process proceeds to Step S106.

The nuisance parking determination unit 23 controls the notification device 3, to notify of the result of the nuisance parking determination (Step S106). Then, the process proceeds to Step S107.

The vehicle control unit 24 controls the own vehicle, to park the own vehicle in the own vehicle parking space specified in Step S105 (Step S107). Then, the process ends.

In Step S108, the nuisance parking determination unit 23 controls the notification device 3, to notify of the result of the nuisance parking determination (Step S108). That is, it is notified that all the parking space candidates are nuisance parking spaces.

In this case, the parking space candidate detection unit 21 causes the own vehicle to move from the current position to another position in order to detect another parking space candidate in which the own vehicle can be parked. Then, the process ends. The parking space candidate detection unit 21 detects a parking space candidate again, after the own vehicle moves from the current position to the other position.

Figure 3:
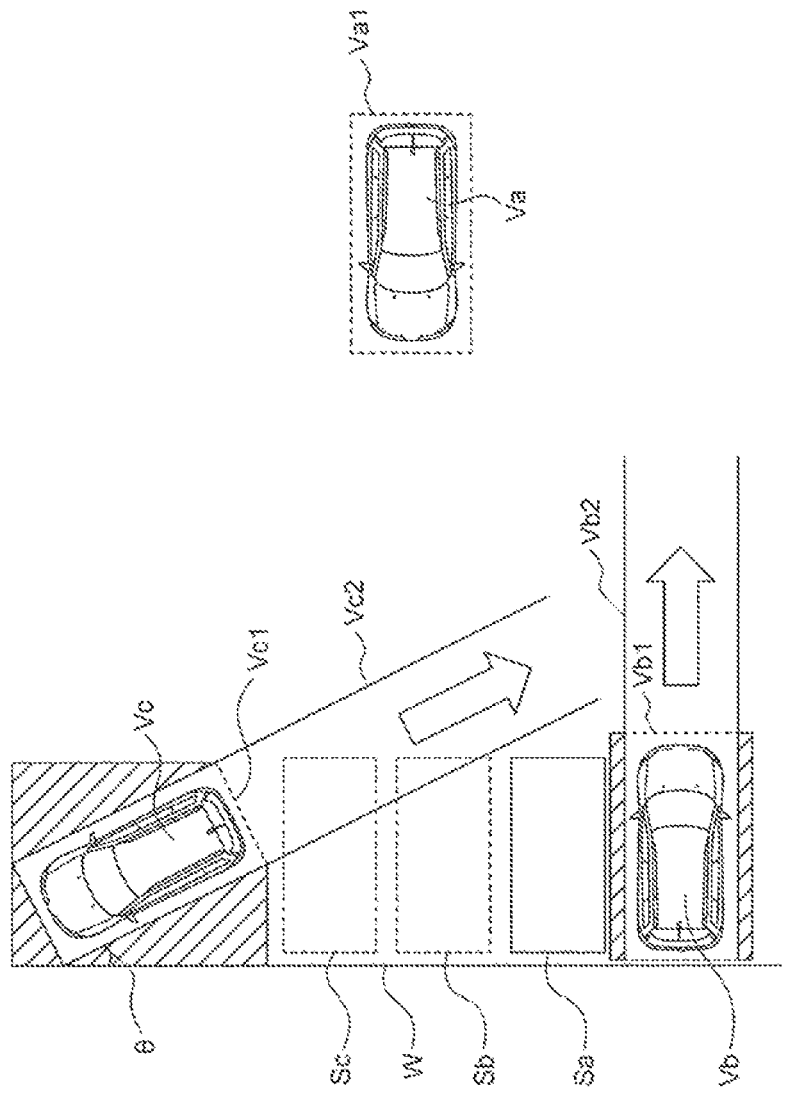
FIG. 3 is a diagram schematically depicting an example of the operation of the vehicle control device according to the first embodiment.

Next, an example of the operation of the vehicle control device 2 will be described specifically with reference to FIG. 3. FIG. 3 is a diagram depicting the example of the operation of the vehicle control device 2 according to the first embodiment. FIG. 3 illustrates other vehicles Vb and Vc other than the own vehicle Va. The other vehicle Vb is parked backward in a direction perpendicular to a wall W, and the other vehicle Vc is parked forward in a direction inclined to the vail W.

The own vehicle Va is equipped with the above-described vehicle system. The parking space candidate detection unit 21 in the vehicle control device 2 equipped in the own vehicle Va detects an empty space having a size greater than a size of a rectangle Va1 defined by the vehicle size of the own vehicle Va, using a vehicle peripheral image acquired from the camera 1.

More specifically, the parking space candidate detection unit 21 detects the other vehicle Vb, the other vehicle Vc, and the wall W, using the vehicle peripheral image acquired from the camera 1. Moreover, the parking space candidate detection unit 21 detects a position at which the detected other vehicle Vb is parked, a vehicle size of the other vehicle Vb, a position at which the detected other vehicle Vc is parked, and a vehicle size of the other vehicle Vc, using the vehicle peripheral image.

Subsequently, the parking space candidate detection unit 21 determines a parking inhibition space using a length of a longer side of a rectangle Vb1 defined by the vehicle size of the other vehicle Vb that is parked in the direction perpendicular to the wall W. Shaded regions around the other vehicle Vb in FIG. 3 correspond to the parking inhibition space. More specifically, the parking space candidate detection unit 21 estimates a shaded region having a width enough for a door of the other vehicle Vb to be opened so that a passenger can get off the other vehicle Vb.

Moreover, for the other vehicle Vc that is parked in the direction inclined to the wall W, the parking space candidate detection unit 21 estimates an angle $\theta$ formed by the wall W and a longer side of a rectangle Vc1 defined by the vehicle size of the other vehicle Vc. The parking space candidate detection unit 21 estimates a parking inhibition space based on the estimated angle $\theta$ and lengths of the longer side and a shorter side of the rectangle Vc1. Shaded regions around the other vehicle Vc in FIG. 3 correspond to the parking inhibition space. More specifically, the parking space candidate detection unit 21 estimates the angle $\theta$ based on a top view image. Then, lines perpendicular to the wall W and going through corners of the rectangle Vc1 are drawn onto the wall W, and thereby the shaded regions are estimated.

The parking space candidate detection unit 21 detects an empty space having a size greater than the size of the rectangle Va1, excluding the above-described parking inhibition spaces.

The parking space candidate detection unit 21 determines a parking space candidate Sa, a parking space candidate Sb, and a parking space candidate Sc, as candidates of the parking space where the own vehicle can be parked, based on the vehicle size of the own vehicle, within the detected empty space. That is, under the condition, illustrated in FIG. 3, the parking space candidate detection unit 21 detects three parking space candidates Sa, Sb and Sc.

The leaving path detection unit 22 detects vehicle information of the other vehicle Vb and vehicle information of the other vehicle Vc using a vehicle peripheral image.

The leaving path detection unit 22 detects, as a leaving path Vb2 of the other vehicle Vb, a region between virtually extended lines which are obtained by extending the longer sides of the rectangle Vb1, defined by the vehicle size of the other vehicle Vb, in the leaving direction of the other vehicle Vb. In FIG. 3, the leaving direction of the other vehicle Vb is a forward direction of the other vehicle Vb that is parked backward. More specifically, because a rear side of the other vehicle Vb is not imaged by the camera 1 and a front side of the other vehicle Vb is imaged by the camera 1, the leaving path detection unit 22 specifies the forward direction of the other vehicle Vb, which is determined to be parked backward, to be the leaving direction of the other vehicle Vb.

Similarly, the leaving path detection unit 22 detects, as a leaving path Vc2 of the other vehicle Vc, a region between virtually extended lines which are obtained by extending the longer sides of the rectangle Vc1, defined by the vehicle size of the other vehicle Vc, in the leaving direction of the other vehicle Vc. In FIG. 3, the leaving direction of the other vehicle Vc is a backward direction of the other vehicle Vc that is parked forward. More specifically, because a front side of the other vehicle Vc is not imaged by the camera 1 and a rear side of the other vehicle Vc is imaged by the camera 1, the leaving path detection unit 22 specifies that the backward direction of the other vehicle Vc, which is determined to be parked forward, to be the leaving direction of the other vehicle Vc.

The nuisance parking determination unit 23 determines, for each of the parking space candidates Sa, Sb and Sc, whether the parking space candidate overlaps with the leaving path Vb2 detected by the leaving path detection unit 22. In this case, as illustrated in FIG. 3, any of the parking space candidates Sa, Sb and Sb are determined not to overlap with the leaving path Vb2.

Similarly, the nuisance parking determination unit 23 determines, for each of the parking space candidates Sa, Sb and Sc, whether the parking space candidate overlaps with the leaving path Vc2 detected by the leaving path detection unit 22. In this case, as illustrated in FIG. 3, although the parking space candidate Sa is determined not to overlap with the leaving path Vc2, both the parking space candidates Sb and Sb are determined to overlap with the leaving path Vc2.

Thus, under the condition illustrated in FIG. 3, the nuisance parking determination unit 23 refers to the above-described determination, and classifies the parking space candidates Sb and Sc that overlap with the leaving path of the other vehicle Vc into nuisance parking spaces. That is, as can be seen from FIG. 3, parking of the own vehicle Va in the parking space candidate Sb and parking in the parking space candidate Sc are nuisance parking to the other vehicle Vc.

Moreover, the nuisance parking determination unit 23 classifies the parking space candidate Sa that does not overlap with the leaving paths of the other vehicles into a non-nuisance parking space. That is, as can be seen from FIG. 3, parking of the own vehicle Va in the parking space candidate Sa is neither nuisance parking to the other vehicle Vb nor nuisance parking to the other vehicle Vc.

In this way, when the vehicle control device 2 equipped in the own vehicle Va detects the parking space candidates Sa, Sb and Sc, in which the own vehicle Va can be parked, the vehicle control device 2 performs the nuisance parking determination for each of the parking space candidates Sa, Sb and Sc, using the leaving paths Vb2 and Vc2 for the detected other vehicles Vb and Vc, respectively.

The nuisance parking determination unit 22 specifies the parking space candidate Sa, which has been classified into the non-nuisance parking space, to be an own vehicle parking space. The vehicle control unit 24 controls the own vehicle Va to park the own vehicle Va in the parking space candidate Sa which has been specified to be the own vehicle parking space. Moreover, the nuisance parking determination unit 23 controls the notification device 3 to notify of the results of the nuisance parking determination. Specifically, the nuisance parking determination unit 23 causes, for example, the notification device 3 to generate a voice message such as "parking of the own vehicle in the parking space candidate Sb and parking in the parking space candidate Sc are nuisance parking, and parking of the own vehicle in the parking space candidate Sa is not nuisance parking."

In the first embodiment described as above, the vehicle control device 2 is implemented by, for example, a processing circuit. The processing circuit includes, for example, a processor and a memory. Each function of a part included in the vehicle control device 2, illustrated in FIG. 1, is provided by software, firmware, or a combination thereof. The software and the firmware are described as programs, and stored in the memory. The processor reads out the program stored in the memory and executes the program, and thereby provides the functions of the respective parts of the vehicle control device 2.

As described above, according to the first embodiment, a vehicle control device is configured to detect a parking space candidate where an own vehicle is parked by using a vehicle peripheral image, and detect a leaving path on which another vehicle that is parked in an other vehicle parking space located in a periphery of the parking space candidate leaves the other vehicle parking space by using the vehicle peripheral image. Furthermore, the vehicle control device is configured to perform nuisance parking determination including determining, for each detected parking space candidate, whether the parking space candidate overlaps with the detected leaving path, and thereby classifying the parking space candidate into a nuisance parking space that overlaps with the leaving path or a non-nuisance parking space that avoids overlapping with the leaving path.

According to the above-described configuration, it becomes possible to confirm whether an own vehicle parking space is a parking space that will cause nuisance parking. Furthermore, a result of the specification is notified, and the own vehicle is controlled to park the own vehicle in the parking space according to the result of the specification, and thereby nuisance parking to another vehicle is suppressed.

REFERENCE SIGNS LIST

1 camera, 2 vehicle control device, 21 parking space candidate detection unit, 22 leaving path detection unit, 23 nuisance parking determination unit, 24 vehicle control unit, 3 notification device

The invention claimed is:

1. A vehicle control device comprising:
a memory which stores at least one instruction; and
a processor which, by executing the at least one instruction, is configured to:
detect a parking space candidate for parking an own vehicle, using a vehicle peripheral image acquired from a camera;
detect, using the vehicle peripheral image, a leaving path on which another vehicle that is parked in an other vehicle parking space located in a periphery of the parking space candidate leaves the other vehicle parking space; and
perform nuisance parking determination including determining, for the parking space candidate, whether the parking space candidate overlaps the leaving path, and classifying the parking space candidate into a nuisance parking space that overlaps the leaving path or a non-nuisance parking space that avoids overlapping the leaving path,
wherein the processor is further configured to:
based on detecting a vehicle size of the other vehicle, identify a rectangular area which is defined by the vehicle size of the other vehicle and encloses the other vehicle,
detect, as the leaving path of the other vehicle, a region between two virtually extended lines obtained by extending longer sides of the rectangular area in a direction of the leaving path of the other vehicle, and
perform the nuisance parking determination by determining whether the region between the two virtually extended lines overlaps the parking space candidate.

2. The vehicle control device according to claim 1, wherein the processor is further configured to:
based on a result of the nuisance parking determination, classify the parking space candidate as the non-nuisance parking space, and
specify the parking space candidate to be an own vehicle parking space in which the own vehicle is to be parked.

3. The vehicle control device according to claim 2, wherein the processor is further configured to control the own vehicle to park the own vehicle in the own vehicle parking space that was specified.

4. The vehicle control device according to claim 1, wherein
the processor is further configured to notify of a result of the nuisance parking determination.

5. A control method of a vehicle, the control method comprising:
detecting a parking space candidate for a for parking an own vehicle, using a vehicle peripheral image;
detecting, using the vehicle peripheral image, a leaving path on which another vehicle that is parked in an other vehicle parking space located in a periphery of the parking space candidate leaves the other vehicle parking space; and
performing nuisance parking determination including determining, for the parking space candidate, whether the parking space candidate overlaps the leaving path, and classifying the parking space candidate into a nuisance parking space that overlaps the leaving path or a non-nuisance parking space that avoids overlapping the leaving path,
wherein the detecting the leaving path further comprises:
based on detecting a vehicle size of the other vehicle, identify a rectangular area which is defined by the vehicle size of the other vehicle and encloses the other vehicle, and
detect, as the leaving path of the other vehicle, a region between two virtually extended lines obtained by extending longer sides of the rectangular area in a direction of the leaving path of the other vehicle, and
wherein the determining whether the parking space candidate overlaps the leaving path further comprises determining whether the region between the two virtually extended lines overlaps the parking space candidate.

6. The vehicle control device according to claim 1, wherein the processor is further configured to:
based on the determining that the region between the two virtually extended lines overlaps the parking space candidate, determine the parking space candidate as the nuisance parking space, and
based on the determining that the region between the two virtually extended lines does not overlap the parking space candidate, determine the parking space candidate as the non-nuisance parking space.

* * * * *